(12) United States Patent
Theobald (10) Patent No.: US 7,902,784 B1
(45) Date of Patent: Mar. 8, 2011

(54) MOBILE ROBOT WITH ARM MEMBER

(76) Inventor: Daniel Theobald, Sommerville, MA (US)

( * ) Notice: Subject to any disclaimer, the term of this patent is extended or adjusted under 35 U.S.C. 154(b) by 0 days.

(21) Appl. No.: 12/721,803

(22) Filed: Mar. 11, 2010

Related U.S. Application Data (63) Continuation of application No. 12/054,276, filed on Mar. 24, 2008, now Pat. No. 7,719,222, and a continuation-in-part of application No. 11/393,577, filed on Mar. 30, 2006, now Pat. No. 7,348,747.

(51) Int. Cl.
*B25J 9/16* (2006.01)

(52) U.S. Cl. ............. 318/568.1; 318/568.21; 318/568.12

(58) Field of Classification Search ............... 318/568.1, 318/568.21, 568.12, 568.11, 628; 700/245; 901/15, 19, 17
See application file for complete search history.

(56) References Cited

U.S. PATENT DOCUMENTS

| 4,996,753 A * | 3/1991 | Jones ............................ 29/26 A |
| 2004/0162636 A1* | 8/2004 | Hattori et al. ................. 700/245 |

* cited by examiner

*Primary Examiner* — Karen Masih
(74) *Attorney, Agent, or Firm* — Albert J. Brunett (57) ABSTRACT

A mobile robot along with a method and system for a mobile robot including an arm member capable of lifting significant loads.

15 Claims, 6 Drawing Sheets

MOBILE ROBOT WITH ARM MEMBER

RELATED APPLICATIONS

This application is a continuation of U.S. patent application Ser. No. 12/054,276, filed on Mar. 24, 2008 which in turn is a continuation-in-part of U.S. Pat. No. 7,348,747 filed on Mar. 30, 2006 the disclosures of which are hereby incorporated by reference.

BACKGROUND OF THE INVENTION

1. Field of the Invention

The present invention relates generally to the field of mobile robotics.

2. Background Art

Robots are often used to perform tasks that are inherently dangerous for humans. For example, robots have been used to explore dangerous caverns as well as disarm explosive devices. Robots may also be deployed in various hazardous environments where the ambient conditions are not conducive for sustaining human life.

All-terrain, mobile robotic vehicles are known and have been discussed extensively in the literature. U.S. Pat. No. 5,022,812 (Coughlin, et al.), U.S. Pat. No. 4,932,831 (White et al.), and U.S. Pat. No. 5,443,354 (Stone et al.) are representative and are hereby incorporated by reference. The iRobot® PackBot® and Foster-Miller® Talon® are two examples of the current state of the art. iRobot® is a developer of robotic and artificial intelligence technology based in Burlington, Mass. Foster-Miller® is an engineering and technology development firm principally located in Watham, Mass., and recently purchased as an independent, wholly owned subsidiary of the British company QinetiQ, Inc. Both robots are capable of navigating up stairs and maneuvering over many kinds of rugged terrain, and can easily self-right themselves if flipped over. However, both these robots suffer from a common drawback. Generally, both robots operate optimally only when they are not burdened with a significant payload. For these robots, having to carry useful payloads can significantly complicate and fundamentally compromise their maneuverability and overall effectiveness.

Robotic torsos and robotic arms capable of lifting payloads of various weights are known. U.S. Pat. No. 4,024,961 (Stolpe), U.S. Pat. No. 4,565,487 (Kroczynski), U.S. Pat. No. 5,394,766 (Johnson et al.) and U.S. Pat. No. 6,408,225 (Ortmeier, et al.) are representative and are hereby incorporated by reference. The PackBot™ Explosive Ordinance Disposal ("EOD"), for example, wields a cumbersome, but useful, 7-DOF (Degrees of Freedom, or actuators) robotic arm. However, if the PackBot™ falls over, righting this robot could do significant damage to the arm and can be a long, slow process.

Applying Dynamic Balancing Behavior ("DBB") to enhance maneuverability and navigation of an apparatus is a known technique and has been addressed extensively in the literature. Illustrative of this literature is U.S. Pat. No. 6,527,071 (Villedieu), U.S. Pat. No. 6,330,494 (Yamamoto), and Raibert, M. H., Legged Robots that Balance, MIT Press, Cambridge, Mass., 1986, all of which are incorporated herein by reference. Particularly useful and incorporated herein by reference, is U.S. Pat. No. 6,302,230 (Kamen, et al.) This patent is related to the Segway® device. Although Dynamic Balancing Behavior ("DBB") has been around for many years, the underlying technology used by the Segway® has only been applied to transporters designed for easily navigable terrain. Further, Segway®-like systems are designed for limited-purpose, human use and are thus equipped with safety features that diminish the marvels of the underlying DBB technology. Finally, Segway® transporters must maintain a strict vertical balance to avoid throwing their riders, and maximum speeds are strictly enforced.

Various systems for controlling mobile robots, such as the software architecture disclosed in U.S. Pat. No. 6,535,793 (Allard), are generally known to those skilled in the art. One such standard architecture for mobile robot control is articulated and set forth in the Joint Architecture for Unmanned Systems (JAUS) documentation. JAUS is mandated for use by all of the programs in the Joint Ground Robotics Enterprise (JGRE). This initiative is designed to develop an architecture for the Domain of Unmanned Systems (DUS). JAUS is an upper level design for the interfaces within the domain of Unmanned Ground Vehicles (UGS). It is a component based, message-passing architecture that specifies data formats and methods of communication among computing nodes. It defines messages and component behaviors that are independent of technology, computer hardware, operator use, and vehicle platforms and isolated from mission.

JAUS uses the Society of Automotive Engineers Generic Open Architecture (SAE GOA) framework to classify the interfaces. It complies with the Joint Technical Architecture as well as the Joint Technical Architecture—Army. JAUS is prescriptive, as opposed to descriptive, and is sufficiently flexible to accommodate technology advances. JAUS can be used by any Unmanned System—Air, Ground, Surface, or Underwater—be it commercial or military.

Further information on the Joint Architecture for Unmanned Ground Systems ("JAUS") can be found at http://www.jauswg.org. This website features the definitive descriptions and publications for elements related to the JAUS standard.

SUMMARY OF THE INVENTION

In the most preferred embodiments of the present invention, an all-terrain, mobile robot, utilizing Dynamic Balancing Behavior ("DBB"), capable of lifting and transporting variable and delicate payloads such as humans, comprising a hybrid mobile robotic platform, an anthropomorphic torso and articulated arms is disclosed.

In accordance with at least one preferred embodiment of the invention, a method for lifting and carrying a human suffering from physical trauma, injury or disability comprises locating the human objective, directing an all-terrain mobile robot to the human's location using a remote control system, stabilizing the human's body in order to safely lift the human wherein medical devices, including but not limited to, inflatable splints, vacuum mattresses and backboards may be applied as needed, lifting the human while eliminating, minimizing, or otherwise limiting the chance of further aggravating injury, evacuating the human from the premises, and transporting the human from the area of danger to a safe area where other humans can provide necessary treatment in relative safety.

According to yet another preferred embodiment of the present invention, a system or platform for extracting a human suffering from physical trauma or injury comprises an all terrain mobile robot; a Joint Architecture for Unmanned Systems ("JAUS") compatible or other similar software architecture, a medical rescue and extraction protocol, wherein the all-terrain mobile robot executes the medical protocol in order to lift and return wounded humans and a JAUS-compatible Operator Control Unit for controlling the all terrain mobile robot. A medical protocol may include activities such as administering medication, applying one or more inflatable splints, utilizing vacuum mattresses and/or backboards to lift and/or transport wounded humans.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, and the accompanying exemplary embodiments shown in the drawings, which are briefly described below.

DETAILED DESCRIPTION

For additional context in understanding the present invention, it may be useful to look at a typical scenario for deploying robots in hazardous situations, such as combat operations in a hostile environment. During combat, when a military service member is wounded on the battlefield, at least two lives are typically placed at stake: the wounded person's life, and that of the medic and/or medevac personnel who must attempt to rescue the wounded service member, if not the wounded person's fellow service members as well. Historically, medic and medevac casualties have been an unavoidable, tragic side of war. A robot capable of performing medevac operations is a desirable tool that could be used to limit medical personnel casualties as well as wounded service member casualties.

However, existing robots possessing advanced lifting and carrying attributes do not possess the agility and maneuverability needed for a medevac rescue. For example, a compact robot can be built to squeeze under a barricade, but it is extremely difficult for one of these small robots to safely position, pick up and bring back even a young child from the other side of the aforementioned barricade. Accordingly, without developing additional robotic capabilities in the areas of maneuverability, agility, balance and strength of a mobile robot possessing an anthropomorphic torso and robotic arms is needed.

Embodiments of the present invention will be described below with reference to the accompanying drawings. It should be understood that the following description is intended to describe exemplary embodiments of the invention, and not to limit the invention.

It is understood that the present invention is not limited to the particular system components, analysis techniques, etc. described herein, as these may vary. It is also to be understood that the terminology used herein is used for the purpose of describing particular embodiments only, and is not intended to limit the scope of the present invention. It must be noted that as used herein and in the appended embodiments, the singular forms "a," "an," and "the" include plural reference unless the context clearly dictates otherwise. The mobile robot described herein as a "system" or "platform" is intended to describe one or more preferred embodiments for implementing the robotic devices shown and described in the accompanying figures.

Unless defined otherwise, all technical and scientific terms used herein have the same meanings as commonly understood by one of ordinary skill in the art to which this invention belongs. Preferred methods, system components, and materials are described, although any methods and materials similar or equivalent to those described herein can be used in the practice or testing of the present invention. All references cited herein are incorporated by reference herein in their entirety.

All publications and patents mentioned herein are incorporated herein by reference for the purpose of describing and disclosing, for example, the system components and methods that are described in the publications, which might be suitably used in connection with the presently described invention. The publications discussed herein are provided solely for their disclosure prior to the filing date of the present application. Nothing herein is to be construed as an admission that the inventors are not entitled to antedate such disclosures by virtue of prior invention or for any other reason.

In certain preferred embodiments of the present invention, the mobile extraction-assist robot disclosed herein may be referred to as a "system" of components comprising a battlefield extraction-assist robot, hereinafter referred to as ("BEAR"). However, the mobile extraction-assist robot may be used in various other applications including, without limitation, general search and rescue operations, animal rescue or extraction, extraction rescue or reconnaissance at dangerous sites such as mines or other treacherous terrain.

Figure 2A:
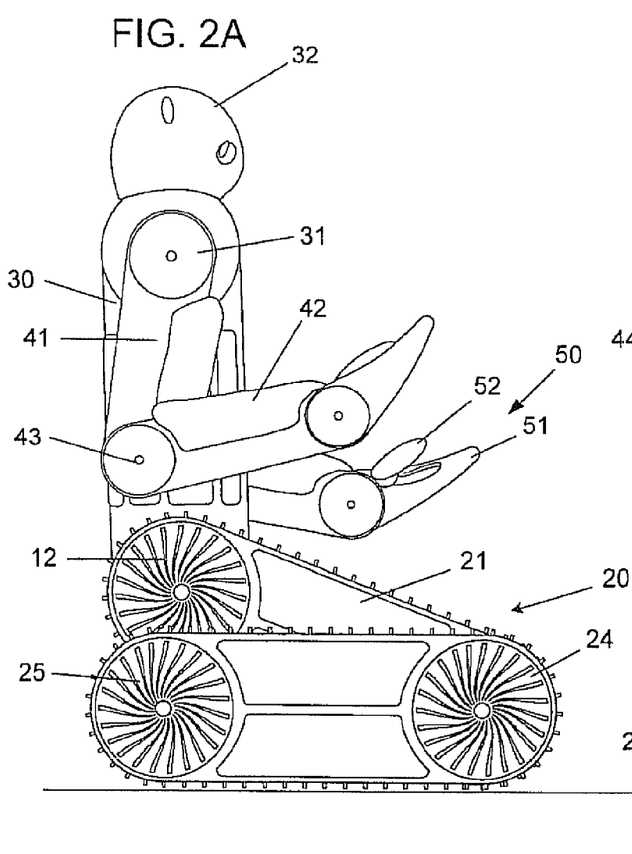
FIG. 2A is a side view of an embodiment of a mobile extraction-assist robot in a folded position.
Figure 2B:
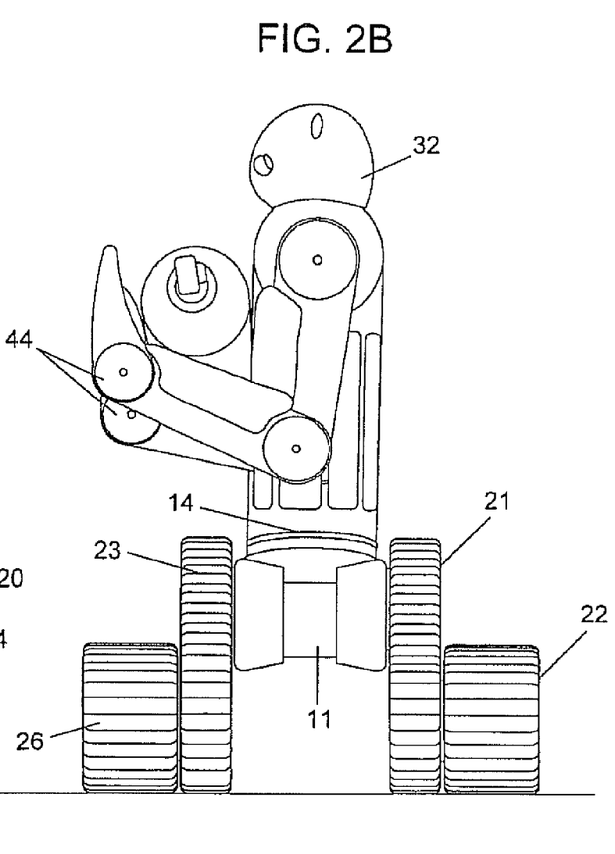
FIG. 2B is a partial front view and a partial side view of an embodiment of a mobile extraction-assist robot carrying a payload.
Figure 3:
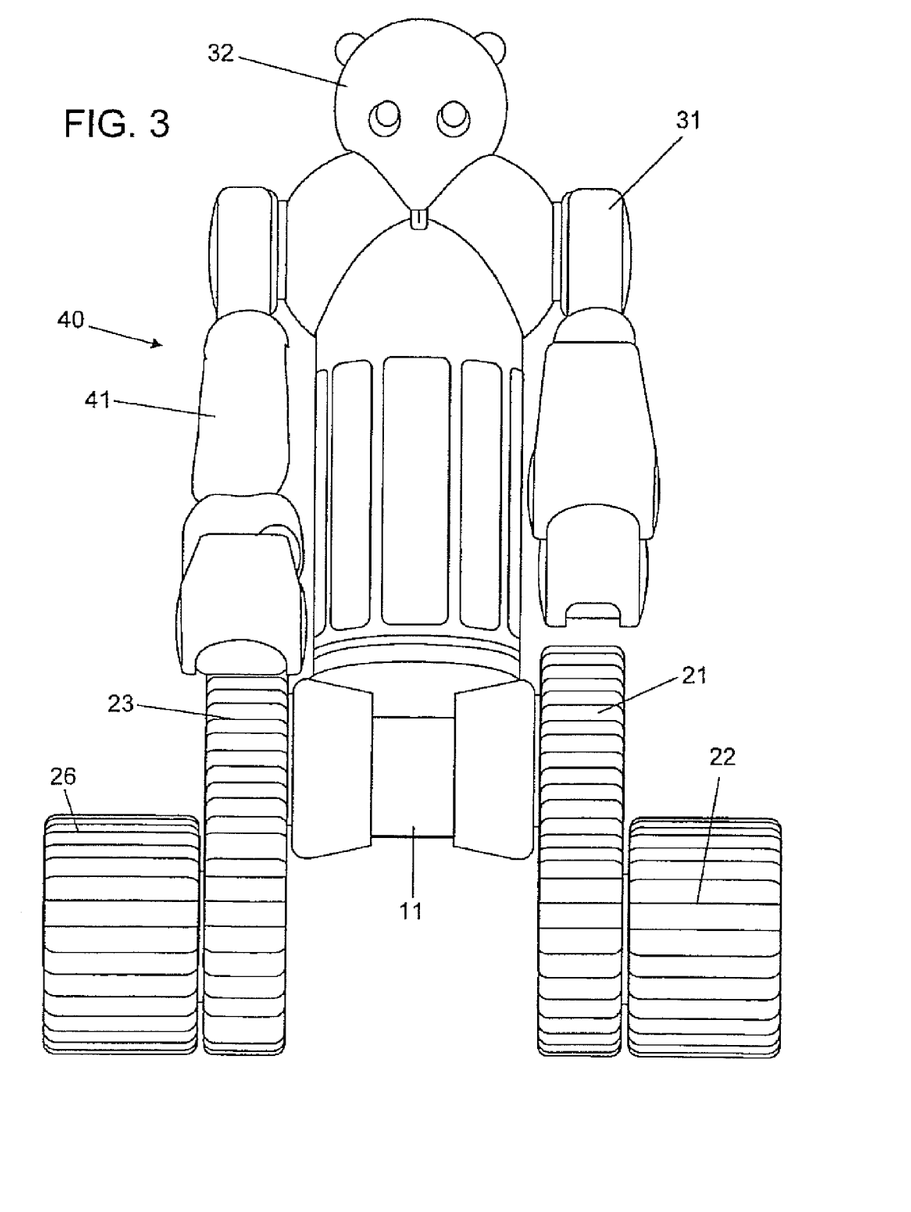
FIG. 3 is a front view of one embodiment of the mobile extraction-assist robot.
Figure 4:
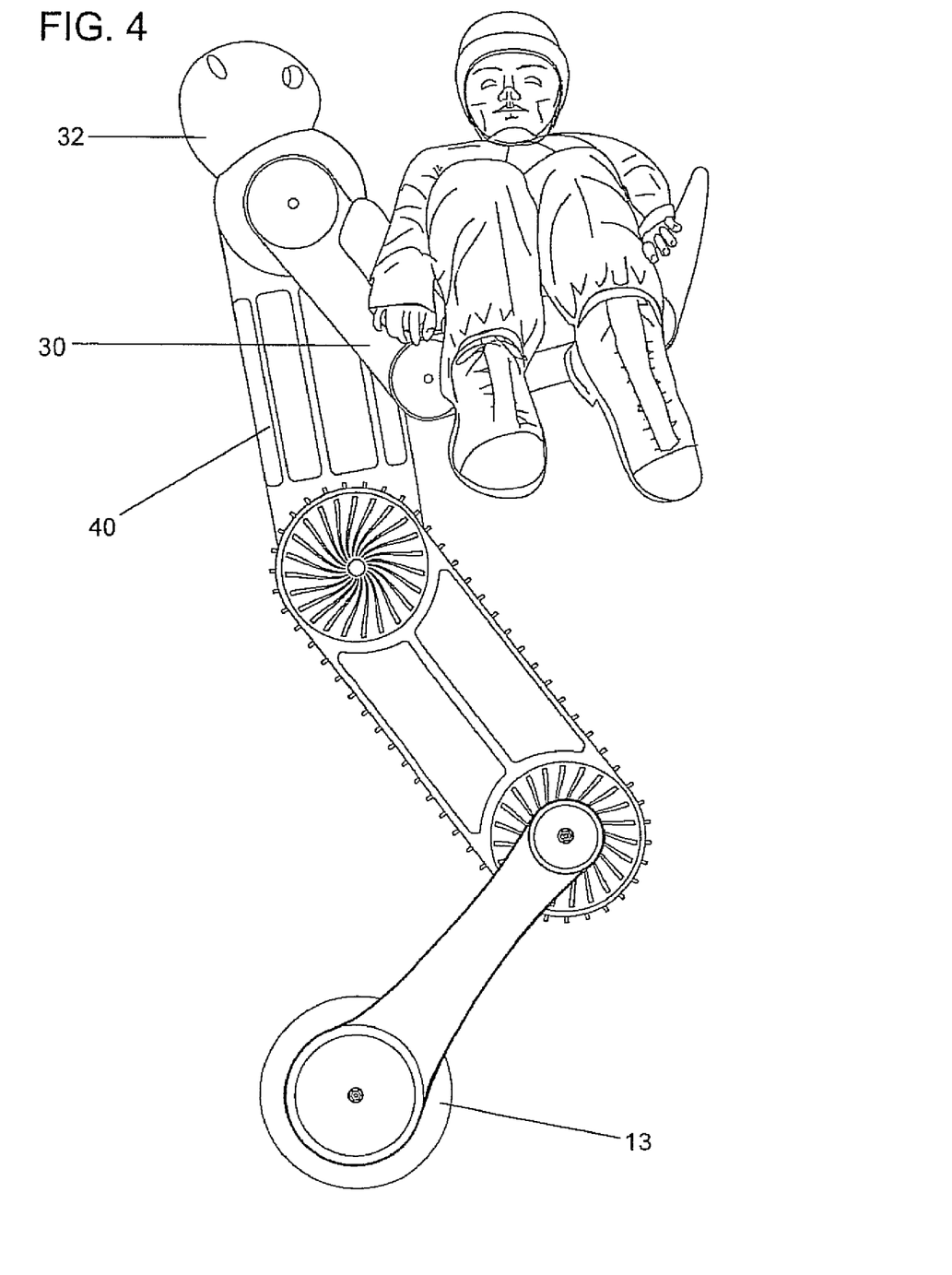
FIG. 4 is skeletal photograph of an embodiment of the mobile extraction-assist robot with a two-wheel platform.

As shown generally in FIGS. 1-4, the BEAR robot comprises a mobility platform 10. Mobility platform 10 includes a base 11. Base 11 has an axle 12. Axle 12 is configured such that various locomotion mechanisms, including one or more wheels 13 (as seen in FIG. 4) or one or more tracked "legs" 20 may be connected to axle 12 to provide mobility platform 10 with the type of locomotion that provides the desired mobility. The connections to mobility platform 10 may be any suitable connection means, including revolute or ball joint connections.

Additionally, base 11 also has a surface mounting portion 14. Surface mounting portion 14 allows various structures, for example, a robotic torso 30 to be securely attached to the mobility platform 10. Surface mounting portion 14 is also capable of rotating 360.degree., thus allowing the structure mounted on mobility platform 10 to rotate 360.degree. Those skilled in the art will recognize that the interchangeable nature of the devices that may be attached to surface mounting portion 14 are limited only by the desired application and the type of connection mechanism used to attach various structure to surface mounting portion 14.

In certain preferred embodiments of the present invention, a tracked "leg" 20 is connected to each side of the base 11 at the axle 12. Legs 20 may consist of two portions, the upper leg 21 and lower leg 22. Upper leg 21 is connected to base 11 at base axle 12. Upper leg 21 has a range of motion such that it may be maintained in one of several positions, including but not limited to a horizontal, elevated or flat position. Upper leg 21 has a movable tracked surface 23 such that upper leg 21 may engage the ground or other surface and cause mobility platform 10 to be moved in a desired direction. Connections between legs 21 and 22 and base 11 as well as to other components may be by In another preferred embodiment of the present invention, mobility platform 10 further comprises a lower leg 22. Lower leg 22 is connected to upper leg 21 by a mid-leg axle 24. In certain embodiments of the invention, lower leg 22 is connected to upper leg 21 such that lower leg 22 is located to the outside of upper leg 21 as shown in FIG. 2B and FIG. 3. Lower leg 22 has a range of motion at mid leg axle 24 such that it may be maintained in one of several positions, including but not limited to a horizontal, elevated or flat position. Lower leg 22 has a bottom axle 25 located at an end opposite mid-leg axle 24.

Further, in at least one preferred embodiment of the present invention, lower leg 22 has a movable tracked surface 26 such that the lower leg 22 may engage the ground or other surface and cause the mobility platform 10 to move in a desired direction. In certain embodiments of the present invention, lower leg 22 has a movable tracked surface 26 that is wider than the movable tracked surface 23 of upper leg portion 21. That is, the movable tracked surface 26 of lower leg 22 has a greater surface area than that of movable tracked surface 23 of upper leg 21. In certain preferred embodiments of the present invention, movable tracked surfaces 23, 26 covering upper 21 and lower 22 leg are configured such that it allows mobility platform 10 to travel over uneven terrain and navigate rough obstacles.

According to at least one preferred embodiment of the present invention. the actuation and articulation of the two "leg" systems is de-coupled. Thus, the system is capable of an unprecedented high degree of agility. For example, when navigating on the side of a steep pitched slope, the BEAR may tuck in leg 20 uppermost on the hill, and extend leg 20 furthermost down on the hill, thereby enabling torso 30 to remain in an upright position for maximum safety in transport. In another example, an on-board navigation-assist system may be employed to automatically adjust to perceived depressions, fallen trees or other navigable obstacles, all the while solving for keeping torso 30 erect, and thus keeping the human patient (or other payload) in an optimal position for safe transport to the target location.

In another aspect of the invention, the BEAR robot has a mobility platform 10 wherein the mobility platform 10 is capable of executing dynamic balancing behavior. Dynamic Balancing Behavior (DBB) technology is described in the following publications and is herein incorporated by reference: U.S. Pat. No. 6,527,071 (Villedieu), U.S. Pat. No. 6,302,230 (Kamen et al), Raibert, M. H., Legged Robots that Balance, MIT Press, Cambridge, Mass., 1986. DBB systems usually include gyroscopes and accelerometers to maintain vertical balance. The BEAR robot system is also equipped with tank-like treads 23, 26 to enable high-performance traction, to navigate steep slopes and rough terrain. Though capable of operating in an upright position, the BEAR robot may utilize its DBB capability together with its treaded design to tilt itself forward or backward on rough terrain, to allow the treads 23, 26 running along the sides of upper and lower legs 20 to provide the greatest amount of possible traction. In addition, unlike a Segway®, the BEAR robot is capable of operating in any position in between vertical and horizontal extremes. This allows a range of versatility and mobility not seen in today's general-purpose robots.

Figure 1:
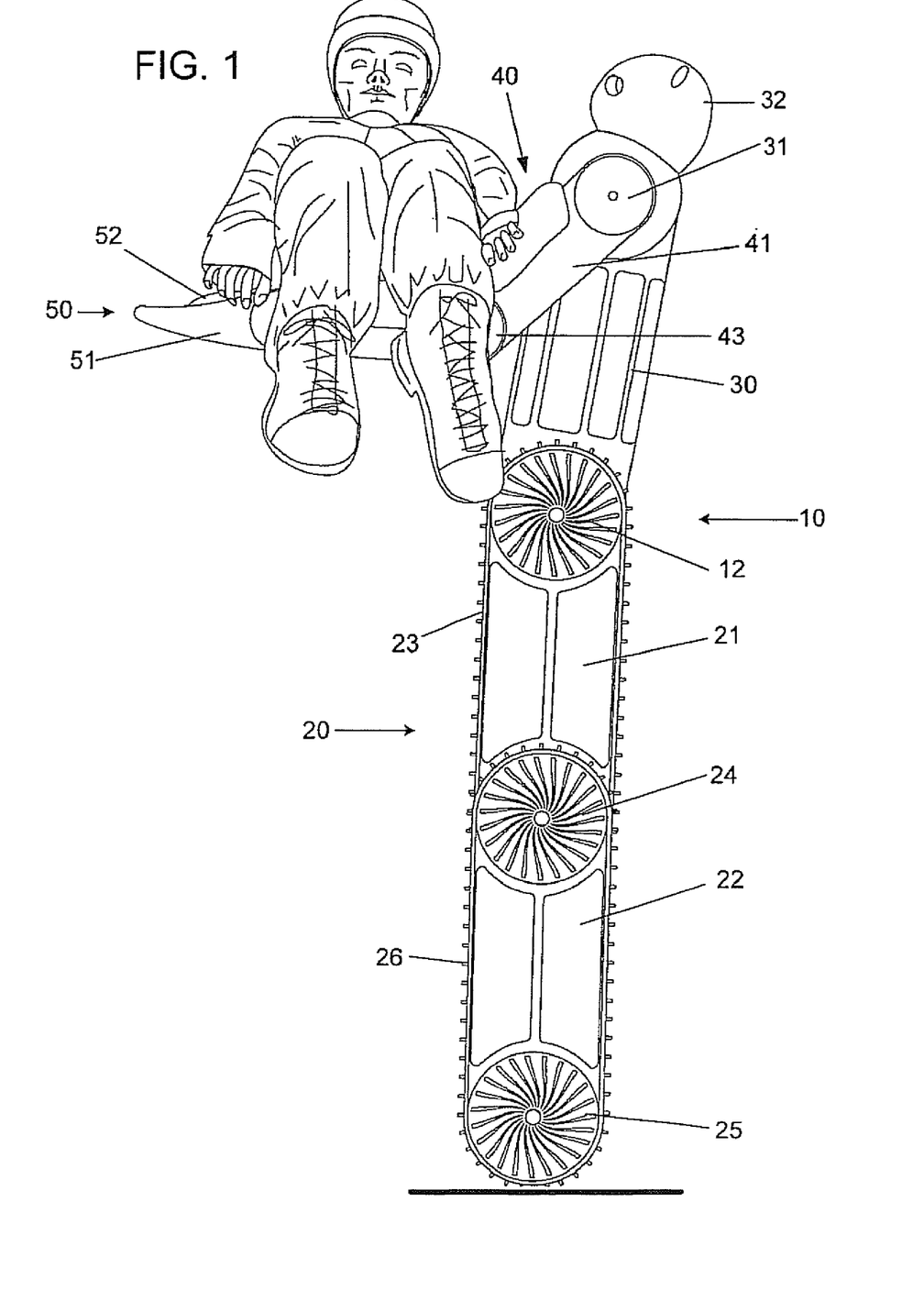
FIG. 1 is a side view of an embodiment of a mobile extraction-assist robot, in a vertical position and carrying a human casualty.

As seen in FIG. 1, in certain aspects of the invention, mobility platform 10 is capable of extending such that the both upper leg 21 and lower leg 22 are perpendicular to the ground. In this position, mobility platform 10 engages its dynamic balancing system to keep the BEAR robot in an upright position.

Referring now to FIG. 2, mobility platform 10 is configured to form a folded position, where the lower legs 22 are parallel to a surface and the upper legs 21 are positioned at an angle with the surface.

Figure 5:
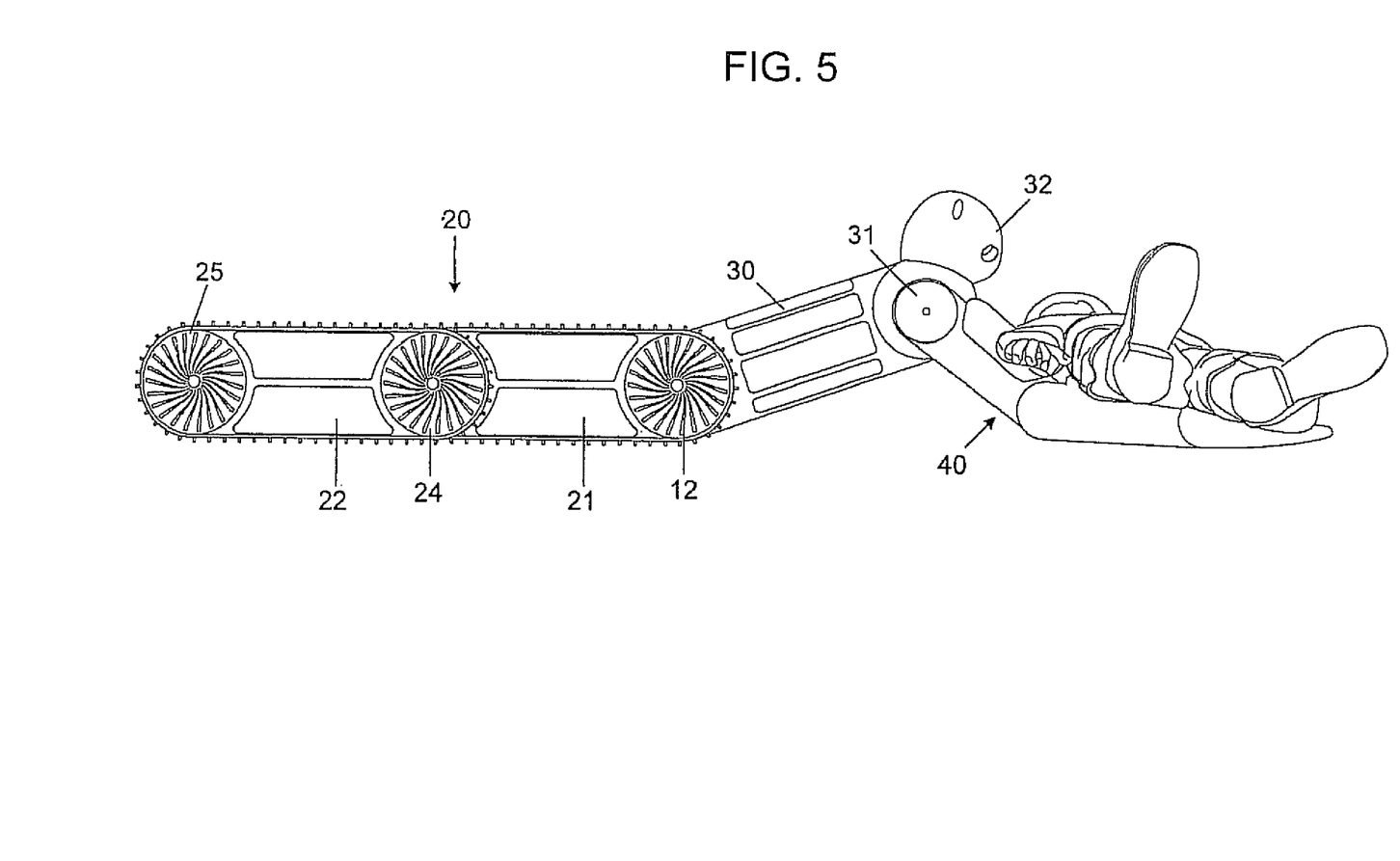
FIG. 5 is a side view of an embodiment of the mobile extraction-assist robot in a casualty retrieval position.

Referring now to FIG. 5, mobility platform 10 is configured to position upper legs 21 and lower legs 22 such that both the lower leg 22 and upper leg 21 are parallel to a horizontal or non-vertical surface.

As seen in the above referenced figures, the BEAR robot is capable of navigating in either a low profile, low center-of-gravity tracked mode or a high profile, high center of gravity tracked mode. Dynamic balance behavior affords the BEAR system a high degree of flexibility and power in a multitude of environments and terrains. The BEAR robot can navigate on its "stomach" (see FIG. 5), it's "back" or its "feet," using its treads 23, 26 to navigate to a spot suitable for righting itself into a vertical position. Likewise, the BEAR robot can manipulate its height to suit the challenges at hand. It can lie down to pass under a low barrier, but right itself if vertical reach is needed.

In accordance with at least one preferred embodiment of the present invention, the BEAR may be entirely teleoperated. In this embodiment, visual and other sensors (heat, sound, etc.) housed in the BEAR robot may collect and send data to the operator(s) of the BEAR robot. Similarly, data signals relative to positioning, locomotion, orientation, etc. may be sent to and from the operator(s) and the BEAR robot, allowing for remote control of the BEAR robot by the operators. The data may be transmitted to and from the robot using any communication media and technology known to those skilled in the art, via cables or other wired means or via wireless communications signals (e.g., Bluetooth, IR, etc.). In either case, transmitters and/or transponders, including Global Positioning System (GPS) units may be employed.

In an alternative preferred embodiment of the present invention, a unique motion-capture system may be used in which the BEAR robot is actuated by real-time movements of a human operator wearing body-position-sensing equipment, in which the data from such equipment is filtered and transmitted to the robot, via wired or wireless communications signals (e.g., Bluetooth, IR, etc.). In accordance with at least one alternative preferred embodiment of the present invention, the BEAR executes autonomous movements and behaviors based on vocal commands e.g., "go rescue that wounded soldier in the stairwell." In this specific embodiment of the present invention, the vocal commands may be composed by invoking certain pre-recorded voice segments or, alternatively, by using a voice-recognition system that translates the vocal commands into programmatic instructions for execution by the BEAR robot. As previously discussed, these instructions may be conveyed to the BEAR robot via wired or wireless communication signaling technology.

In certain embodiments, the BEAR robot possesses an anthropomorphic torso 30 and articulated arms 40 suited for lifting and carrying various payloads. However, torso 30 of the BEAR robot may be various shapes and sizes. The robot may feature a shorter torso 30 for increased balance and lower center of gravity, or a longer, more slender torso 30 to enable the robot to reach higher items. Torso 30 may also telescope up and/or contract. Torso 30 may be cylindrical, or more box-like in shape, or be semi-round such as hexagonal or octagonal in cross section.

Additionally, torso 30 may be optimized for use in a configuration designed to navigate horizontally, on its belly or back, and thus potentially feature rollers or active tracked sub-systems embedded in its front and/or back—useful for crawling under a vehicle to use its powerful hydraulic arms 40 to raise the vehicle high enough to rescue a victim trapped beneath it. Robotic technology capable of simulating the movements of a human torso and arms is described in the following publications and is hereby incorporated by reference: U.S. Pat. No. 4,024,961 (Stolpe), U.S. Pat. No. 4,565, 487 (Kroczynski), U.S. Pat. No. 5,394,766 (Johnson et al.) and U.S. Pat. No. 6,408,225 (Ortmeier et al.)

As seen in FIGS. 1-3, in certain embodiments of the invention, the invention has a torso 30 attached to the surface mounting portion 14 of the mobility platform 10. At least one, but preferably two or more shoulder joints 31 are positioned on opposite sides of the torso 30. A fully articulated arm 40 is attached to each shoulder joint 31. A head unit 32 is attached to the top of the torso 30.

The head may be largely decorative (e.g. to make the robot look less threatening to injured soldiers) but may also contain sensor and/or actuator equipment such as one or more cameras and/or other sensors, antennae for communication with the operator, speakers, and/or other communication and operational systems.

In certain embodiments of the invention, the articulated arm 40 consists of an upper arm 41, a lower arm 42 and a hand 50. The upper arm 41 has an elbow joint 43 and is directly attached to the shoulder joint 31. The lower arm 42 has a wrist joint 44 and is attached to the upper arm 41 at the elbow joint 43. The hand 50 is attached to the lower arm 42 at the wrist joint 44. Further, in certain embodiments of the invention, the hand 50 possesses a gripping member 51 and a thumb-like member 52 attached to the gripping member 51. Thus, the thumb-like member 52 provides the BEAR robot with the ability to simulate human-like gripping positions. The robot's shoulders 31 are capable of rotating at least 360.degree., and the elbows 43 are capable of moving at least 130.degree., from a fully-flexed position in which lower arm 42 and upper arm 41 form a straight rod, to a "bicep curl" where the robot's hand 50 moves closer to its shoulder 31.

The robot's hands 50 consist of powerful hydraulic actuation at the wrist, coupled with highly-sensitive actuation in the hand 50, using a series-elastic actuator or similar device to gain such sensitivity. The hand 50 may also feature a series of motorized rollers to assist the hand 50 in working its way gently underneath a human victim's torso or legs, with the intention of lifting the human up. Further, the robot's hands 50 feature an opposable thumb actuator 52 that enables the robot to grasp a hand or a foot—again, employing a series-elastic actuator or similar device to enable a gentle touch that does not crush the human limb by means of teleoperated or automated force-feedback capability.

The hands 50 and or lower arms 42 may also feature lateral extension surfaces that telescopically extend out from the sides of the hands 50 and/or arms 40, to provide a broader surface area on which the victim's body may rest, for increased comfort during extraction and/or escape, as well as for increased safety. Neck-brace-like equipment may be deployed from one or more hands/arms, and splints and/or other equipment such as tourniquets may be deployed from the robot's upper limbs as well.

Further, a padded surface covers the inside surface of the upper arm 41, lower arm 42 and hand 50. Consequently, the padded surface may prevent or reduce the chance of the BEAR robot causing further harm to an injured person in the process of lifting that person. The arm padding may consist of a smooth leather or leather-like surface that will easily receive and naturally position a victim or injured person's body for optimal comfort during extraction as well as during escape. The padding underneath may consist of a semi-dense foam rubber or similar material, and/or an automatically conforming "memory foam" to cushion and protect the human passenger from the hard skeletal and/or exoskeleton exterior surface of the robot's limbs.

In certain preferred embodiments of the present invention, the articulated arms 40 and anthropomorphic torso 30 utilize hydraulic systems to enable the BEAR robot to lift and carry payloads such as injured service members or other large and/or heavy objects. The use of hydraulic powered systems as applied to lifting objects is known in the art. See the following patents, incorporated by reference herein: U.S. Pat. No. 4,024,961 (Stolpe), U.S. Pat. No. 4,565,487 (Kroczynski), U.S. Pat. No. 5,394,766 (Johnson et al.) and U.S. Pat. No. 6,408,225 (Ortmeier et al.).

Figure 6:
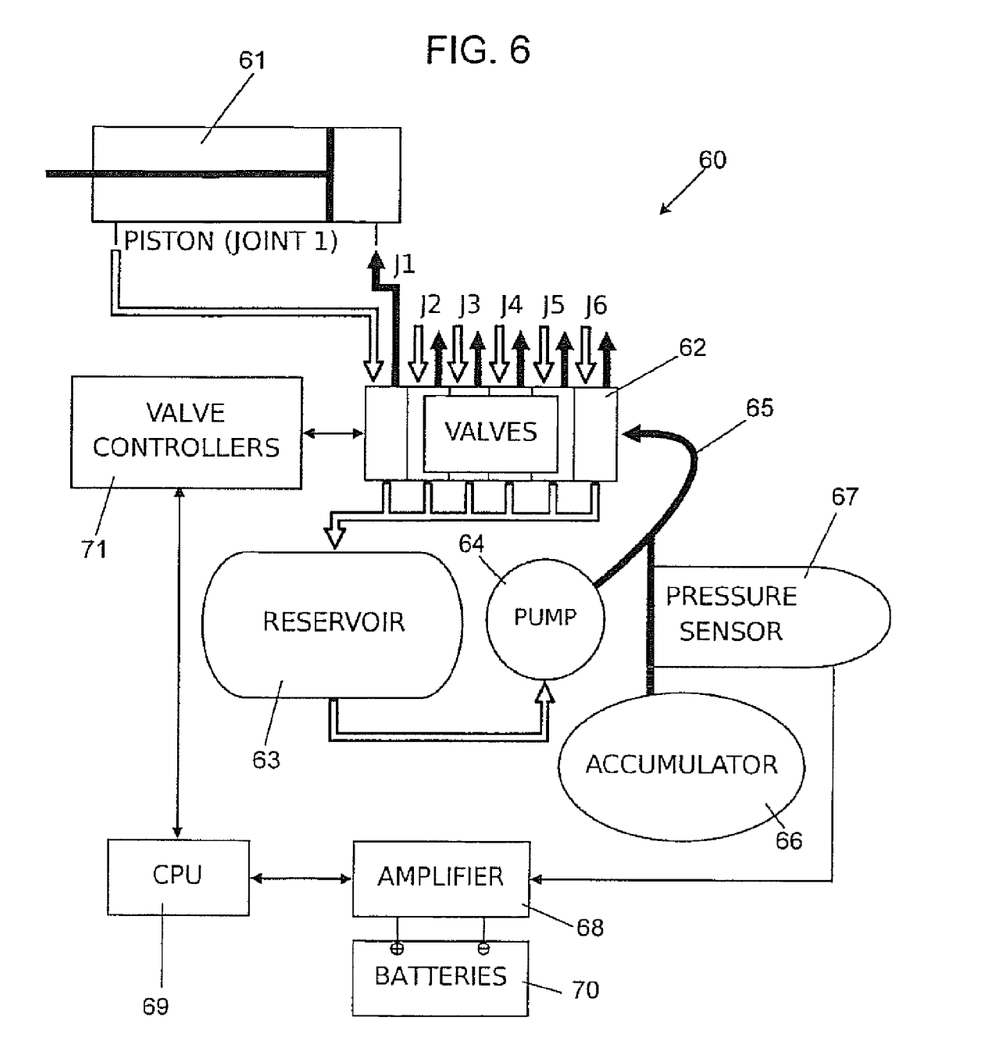
FIG. 6 is a schematic of an embodiment of the hydraulic system for a mobile extraction-assist robot.

In certain preferred embodiments of the present invention, the BEAR robot utilizes a hydraulic system to operate its torso 30 and arms 40. As seen in FIG. 6, the hydraulic system 60 includes a plurality of pistons 61 that serve as the primary actuators at the various joints 31, 43, 44 of the robotic torso 30 and arms 40 of the BEAR robot. The pistons 61 (only one shown in FIG. 6) are operably connected to a series of valves 62. A reservoir 63 for hydraulic fluid is operably connected to the series of valves 62. The reservoir 63 feeds hydraulic fluid to a pump 64, which is operably connected to the pump 64 and the series of valves 62. The pump 64 pumps the hydraulic fluid to the valves 62 through a pump line 65. An accumulator 66 is operably connected to the pump line 65. A pressure sensor 67 is operably connected to the accumulator 66 and linked to an amplifier 68. A central processing unit ("CPU") 69 (with one or more memory components for storing CPU instructions and data, not shown this FIG.) is operably connected to the amplifier 68. Additionally, a power source 70 is connected to the amplifier 68.

In certain alternative preferred embodiments of the present invention, the power source 70 is a battery or series of batteries, and may include rechargeable batteries or battery packs. CPU 69 is also operably connected to a series of valve controllers 71 that are connected to one or more valves 62 and control the valve operation. CPU 69 receives input from the pressure sensor 67 and valve controllers 71. This allows CPU 69 to modulate the pressure applied by a given piston 61 to allow for acute movement of the BEAR robot's joints including its torso 30 and arms 40. This processor control embodiment of the present invention enables variable control of hydraulic actuators (over a variable range of pressures), as opposed to the typical only fully-on/fully off piston control.

A hydraulic powered torso 30 and arms 40 provides many benefits, chief among them the capability to pick up and transport injured service members and/or civilians out of harm's way, potentially saving many lives. Due to the hydraulic system, the robotic upper body possesses the strength, for example, to lift and move a person. The sensor and actuation system in the robotic hands 50 give the robot a combination of dexterity and sensitivity, for example, to safely immobilize a patient on a split backboard vacuum mattress and apply splints. In combination with an all-terrain mobile torso, the BEAR robot is able to swiftly reach a service member who may be injured and who may have fallen into any one of a wide variety of body positions, in any one of a wide variety of body orientations, and in any one of a wide variety of physically-constrained locations such as on a battlefield, in a ditch or in an urban stairwell, and transport him or her to safety.

Furthermore, the hydraulic system applied to the BEAR robot's torso 30 in combination with the dynamically balanced mobility platform 10 allows the BEAR robot to achieve a level of agility in the form of movements and torques necessary to move a fully-weighted and fully-sized person from the following positions: a) from prone to supine; b) from sitting to supine; c) from semi-prone one leg flexed at the hip to supine both legs and arms adducted (closed together). In addition, the BEAR robot possesses the ability to lift and carry a life size, standard sized person with full military gear which may include armaments, munitions, supplies and/or specialized equipment. Moreover, the hydraulic systems, deployed in combination with above-described sensing, actuation and/or combination sensor/actuator systems such as series-elastic actuators, are designed to allow the BEAR to handle persons in shock or who have suffered significant trauma with the sensitivity necessary to prevent further harm.

For example, a service member may be injured with a bullet wound in the leg and a consequent loss of blood, and loss of consciousness. Furthermore, the service member may be injured in the context of urban warfare, and may have fallen backward into a closet on the second floor of a damaged building, knocking heavy boxes on top of the service member in the process. Using teleoperation by a remote operator, the BEAR robot can navigate into a stairwell and up the stairs of the building using a variety of different positions, as partially illustrated in FIGS. 1-5. The robot can then navigate into the room of the fallen service member, and the remote operator may choose to use any one or more of a variety of strategies to safely extract the service member from the closet area.

These include using the dexterous hands, arms 40 and upper body/torso 30 to grasp the heavy boxes fallen on top of the service member and using the robot's hydraulic system to lift the boxes from on top of the victim; using the gripping thumbs, the hydraulics and the mobility system to gently pull the victim into a position to apply a neck splint, leg tourniquet and/or other lifesaving and/or patient transport safety equipment; using the hydraulic system together with other systems to load the patient onto the BEAR robot's arms 40, and lift the patient to a secure position; using the hydraulic system, working interactively with the mobility and other systems, to adjust body movements as needed to navigate down the stairwell employing both on-board patient-body-awareness systems as well as the tele-operator's skill in taking care not to cause further injury to the patient in the transport process; using such systems to assist the robot in navigating through doorways using the robot's agility systems, for instance by pivoting the robot's torso 30 90.degree. to the side to get both robot and patient safely through narrow doorways; and finally, using the hydraulics system to elevate both robotic torso 30 and patient to "standing", dynamic-balancing position to enable the robot to move at high speed over known or visible terrain to evacuate the patient to a waiting paramedic rescue team. Once there, the robot would employ its hydraulic systems, in tandem with other sensor and actuation systems, to gently lower the patient onto stretcher or gurney, for immediate treatment and transport to a hospital facility.

In certain embodiments of the invention, the BEAR robot system utilizes the JAUS software architecture as specified by the JAUS Work Group ("JAUSWG") and fully consistent with the Department of Defense (DoD) Acquisition Guidelines. The use of the JAUS software architecture in conjunction with mobile robots is known. Further information on JAUS, the Joint Architecture for Unmanned Ground Systems can be found at http://www/jauswg.org, the disclosure of which is herein incorporated by reference. This website features the definitive descriptions and publications for elements related to the JAUS standard.

In certain preferred embodiments of the present invention, the BEAR's software system reflects the JAUS specification's hardware-independent standard of six Functional Agents (Command, Telecom, Mobility, Payloads, User Training, and Maintenance) and its four Knowledge Stores (Vehicle Status, World Map, Library, and Log). In addition, the JAUS architectural style of "Data Upon Request" is implemented to support the goal of domain-wide system evolution.

Thus, all operations of the BEAR Robot's, whether tele-operated or semi-autonomous, are fully controllable by any JAUS-compatible Operator Control Unit ("OCU"). Toward that end, payload bays of the BEAR robot are constructed using a fully implemented JAUS Xport. In certain embodiments, the BEAR's torso 30 itself will ideally connect to the hybrid base 11 using an Xport. JAUS Xport is an emerging hardware interface standard that enables various payloads such as robotic arms, neck/head assemblies and/or other sensor/actuator packages, created by any participating manufacturer to connect to various mobility or other robotic platforms made by any other participating manufacturer. Such a standard, enables a high degree of "plug and play" interoperability between platforms and payloads such as arms, torsos, mine-sweeping tools and other pieces of equipment, for optimal flexibility of deployment and utility in the field.

In certain embodiments, the ground-up JAUS design of the BEAR robot's upper body/torso and arms allows plug-and-play installation and control on virtually any JAUS-compatible transportation platform, thus, enabling a versatile array of configurations to perform many different kinds of tasks.

Similarly, the control architecture is highly flexible. The tele-operated BEAR robot may use an Operator Control Unit that features joysticks and other standard user interface components. Alternatively, the BEAR robot may use Motion Capture Technology ("MCT"). The MCT system employs such equipment as data gloves, position-control helmet, and other devices to enable a user to remotely control the robot and perform rescues in a highly intuitive and safe manner, in some cases enabling the robot to assume the dexterity of the human operator on its missions. Further, the BEAR robot control system may be modified for non-combat situations. For example, in certain embodiments the present invention may employ Artificial Intelligence systems to enable the robot to navigate, avoid obstacles, learn from human users and interact with users in socially appropriate ways. Another example is that the robot may be configured as a logistical support robot, lifting large packages or other payloads and transporting them to another location, such as from a warehouse to a vehicle for loading material.

Various preferred embodiments of the present invention described herein as the BEAR robot possess several advantages over known robots. A next-generation, dynamically-balanced mobile platform such as the BEAR allows the same robot to be used for a wide variety of tasks. The combination of an all-terrain, tracked mobility platform 10 capable of dynamic balancing behavior, together with a powerful hydraulic system, would enable the BEAR robot to have the agility to navigate efficiently in a variety of positions, many of which would be difficult or impossible for a human.

For example, the hydraulic system would be capable of lifting the torso base 11 to variable levels, from positions corresponding to kneeling, crouching, and/or positions between a crouch and a standing position, enabling the robot to move via dynamic balancing on the "balls of its feet" in any if these positions. Further, as described earlier, independent movement of the legs 20 (which may be at two or more levels) enables a new level of mobile agility, enabling the robot to dynamically balance over uneven terrain. For example, when moving via dynamic balancing in a vertical position (as shown in FIG. 1), by sensing the terrain immediately in front of the robot, the robot is able to "lift a leg" as needed during locomotion to adjust for lateral stability.

In certain preferred embodiments of the present invention, the BEAR robot also possesses the ability to use minimally modified medical equipment with the BEAR system to immobilize casualties, lower risk of injury and complication due to extraction, and potentially enable multiple simultaneous casualty extraction. A properly equipped BEAR could act as a transportation device for patient medications between wards in a hospital, and also tidy up the waiting room when it has nothing else to do. Indeed, the utility of this versatile robot includes use in toxic zones such as in Nuclear, Biological and/or Chemical ("NBC") weapons release sites where rescuing humans are unable to safely go, as well as for logistics support and a host of other non-combat military purposes.

Additionally, the BEAR platform could be used in hospitals and other commercial applications, as well as for uses of vital importance in consumer applications. For example, the BEAR robot's capabilities can be extended to include assisting elderly, disabled or otherwise-incapacitated users with Activities of Daily Living ("ADLs") with complete safety. ADLs include getting in and out of bed, getting in and out of a bathtub, getting on and off the toilet, and generally navigating around the disabled user's living quarters.

Moreover, a service member need no longer remember the differences between how to control the movement of a mine-sweeping robot and how to control an equipment carrier robot, since they are both built on the same flexible BEAR platform and use a consistent user interface. A mechanic's job is also rendered easier when he has fewer robotic platforms with which he needs to be familiar, allowing him to be trained quicker and to work faster and more efficiently.

Although the present invention to has been described above with reference to certain embodiments of the invention, the invention is not limited to the embodiments described above. Variations, alternatives, and modifications will occur to those skilled in the art, in light of the teachings herein. All such variations, alternatives, and modifications are considered a part of the present invention.

I claim:

1. A mobile robot, comprising:
a body portion; and
at least one arm member operably connected to the body portion and at least capable of rapid, substantially instantaneous acceleration sufficient to generate a substantial force to act on another article or surface remote from the mobile robot.

2. The mobile robot as defined in claim 1, wherein the force generated enables the mobile robot to rapidly lift an article that weighs at least as much as the mobile robot.

3. The mobile robot as defined in claim 1, wherein the force generated enables the mobile robot to cause the remote surface to be altered.

4. The mobile robot as defined in claim 1, wherein the remote surface is glass and the force generated enables the mobile robot to break the glass.

5. The mobile robot as defined in claim 1, wherein the remote surface is the earth and the force generated enables the mobile robot to dig into the earth.

6. The mobile robot as defined in claim 1, wherein the remote surface is a road surface and the force generated enables the mobile robot to dig into the road surface.

7. The mobile robot as defined in claim 1, wherein the arm member is capable of providing rapid, substantially instantaneous deceleration.

8. The mobile robot as defined in claim 1, wherein the mobile robot is capable of lifting a non-rigid article.

9. The mobile robot as defined in claim 1, wherein the mobile robot can at least lift between two and seven times its own weight.

10. A method of transporting articles, comprising:
providing an autonomous robot;
providing a list of articles to be gathered to the robot;
gathering the articles via the robot from various points within an area without any intervention from outside the robot; and
having the robot place the gathered articles in a designated area.

11. The method as defined in claim 10, wherein the articles are gathered on a platform carried by the robot.

12. The method as defined in claim 10, wherein the robot is capable of gathering articles that may change shape.

13. The method as defined in claim 10, wherein the robot includes at least two arm members for gathering articles.

14. A mobile robot, comprising:
a plurality of components; and
a power source having a predetermined, high power density in operable communication with each component and capable of delivering the full power density to any particular component at one time.

15. The mobile robot as defined in claim 14, wherein the plurality of components includes at least two arm members.

* * * * *